(12) United States Patent
Tang (10) Patent No.: US 12,386,219 B1
(45) Date of Patent: Aug. 12, 2025

(54) DISPLAY PANEL AND DISPLAY DEVICE

(71) Applicant: Shenzhen China Star Optoelectronics Semiconductor Display Technology Co., Ltd., Guangdong (CN)

(72) Inventor: Min Tang, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/661,676

(22) Filed: May 12, 2024

(30) Foreign Application Priority Data

Mar. 19, 2024 (CN) .......................... 202410316733.X (51) Int. Cl.
| | |
|---|---|
| *G02F 1/1335* | (2006.01) |
| *G02F 1/1333* | (2006.01) |
| *G02F 1/1337* | (2006.01) |
| *G02F 1/1343* | (2006.01) |
| *G02F 1/1362* | (2006.01) |

(52) U.S. Cl.
CPC .. *G02F 1/133514* (2013.01); *G02F 1/133371* (2013.01); *G02F 1/133707* (2013.01); *G02F 1/134309* (2013.01); *G02F 1/136222* (2021.01)

(58) Field of Classification Search
CPC ......... G02F 1/136222; G02F 1/133371; G02F 1/133707
See application file for complete search history.

(56) References Cited

U.S. PATENT DOCUMENTS

2019/0137814 A1\* 5/2019 Huang .............. G02F 1/133512

FOREIGN PATENT DOCUMENTS

CN 111338133 A \* 6/2020 ........... G02F 1/1333

\* cited by examiner

*Primary Examiner* — Jessica M Merlin
(74) *Attorney, Agent, or Firm* — PV IP PC; Wei Te Chung (57) ABSTRACT

A display panel and a display device are provided, featuring a first substrate with a first base and a pixel electrode layer on one side. A light-modulating medium layer is on one side of the pixel electrode layer, facing away from the first base. The second substrate, on one side of the light-modulating medium layer away from the first substrate, includes a second base and a common electrode layer facing the light-modulating medium layer. The first substrate includes a first organic insulating layer between the first base and the pixel electrode layer, causing a surface of the pixel electrode layer facing away from the first base to be uneven. Alternatively, the second substrate includes a second organic insulating layer between the second base and the common electrode layer, making the common electrode surface uneven. This design enhances display effects at wide angles while ensuring high aperture ratio and light transmittance.

14 Claims, 7 Drawing Sheets

DISPLAY PANEL AND DISPLAY DEVICE

FIELD OF DISCLOSURE

The present application relates to a field of display technology, specifically to a display panel and a display device.

DESCRIPTION OF RELATED ART

With the development of display technology, flat-panel display devices such as liquid crystal displays (LCDs) are widely used in various consumer electronic products like mobile phones, televisions, personal digital assistants, digital cameras, laptops, and desktop computers, due to their high-quality imagery, power efficiency, thin body, and broad application range, becoming the mainstream in display devices.

In related technology, a multi-domain design is commonly used to enhance the display effect of vertically aligned liquid crystal display panels at wide viewing angles. Theoretically, the more sub-pixel domains are designed, the better the display effect at wide viewing angles. However, an increase in the number of sub-pixel domains reduces the aperture ratio of sub-pixels, decreases light transmittance, and increases the power consumption of the display panel, which is a problem that urgently needs to be addressed.

SUMMARY OF INVENTION

The present application provides a display panel and a display device that effectively solve the existing problem of being unable to improve the display effect at wide viewing angles while simultaneously maintaining a high aperture ratio, high light transmittance, and low power consumption in current display panels.

In a first aspect, the present application provides a display panel. The display panel includes: a first substrate, including a first base and a pixel electrode layer disposed on one side of the first base; a light-modulating medium layer, disposed on one side of the pixel electrode layer that is away from the first base; and a second substrate, disposed on one side of the light-modulating medium layer that is away from the first substrate, the second substrate including a second base and a common electrode layer arranged on one side of the second base facing the light-modulating medium layer; wherein the first substrate includes a first organic insulating layer disposed between the first base and the pixel electrode layer, and the first organic insulating layer causes a surface of the pixel electrode layer that is away from the first base to be uneven; or, the second substrate includes a second organic insulating layer disposed between the second base and the common electrode layer, and the second organic insulating layer causes a surface of the common electrode layer that is away from the second base to be uneven.

Optionally, the first substrate includes a color filter layer and a first organic insulating layer, the first organic insulating layer is disposed between the color filter layer and the pixel electrode layer, the color filter layer includes a plurality of color filter units, the pixel electrode layer includes a plurality of pixel electrodes, the pixel electrodes are disposed corresponding to the color filter units in a one-to-one correspondence, and each of the pixel electrodes includes a plurality of branches, wherein within each pixel electrode, at least part of one of the branches is at a first distance from a bottom surface of the color filter unit, and at least part of another branch is at a second distance from the bottom surface of the color filter unit, with the first distance being different from the second distance.

Optionally, the first substrate further includes the first organic insulating layer, the first organic insulating layer includes a plurality of first parts and a plurality of second parts, each of the first parts possesses a first thickness, each of the second parts possesses a second thickness, and the first thickness is different from the second thickness;

at least part of one branch, which is at the first distance from the bottom surface of the color filter unit, corresponds to the first part, and at least part of another branch, which is at the second distance from the bottom surface of the color filter unit, corresponds to the second part.

Optionally, each of the pixel electrodes includes four branches, each of the branches includes a plurality of branch electrodes, and within each pixel electrode, orientations of the branch electrodes in any two branches are different;

in each of the pixel electrodes, two of the four branches are at the first distance from the bottom surface of the color filter unit, and the other two branches are at the second distance from the bottom surface of the color filter unit.

Optionally, the first substrate further includes a plurality of thin-film transistors, wherein in each of the pixel electrodes, the branch electrodes of all the branches are all electrically connected to one of the thin-film transistors.

Optionally, the pixel electrodes are sequentially arranged in the first direction and the second direction, wherein within each pixel electrode, two branches that are at the first distance from the bottom surface of the color filter unit are adjacent to each other in either the first direction or the second direction, and two branches that are at the second distance from the bottom surface of the color filter unit are adjacent to each other in either the first direction or the second direction; or, two branches that are at the first distance from the bottom surface of the color filter unit are not adjacent to each other in the first direction and the second direction, and two branches that are at the second distance from the bottom surface of the color filter unit are not adjacent in the first direction and the second direction.

Optionally, each of the pixel electrodes is divided into two first regions and two second regions, wherein in one of two adjacent pixel electrodes in the first direction, two branches at the first distance from the bottom surface of the color filter unit are located in the two first regions respectively, and the other two branches at the second distance from the bottom surface of the color filter unit are located in the two second regions respectively, while in the other of the two adjacent pixel electrodes in the first direction, two branches at the first distance from the bottom surface of the color filter unit are located in the two second regions respectively, and the other two branches at the second distance from the bottom surface of the color filter unit are located in the two first regions respectively.

Optionally, in one of two adjacent pixel electrodes in the second direction, two branches that are at the first distance from the bottom surface of the color filter unit are located in the two first regions respectively, and the other two branches that are at the second distance from the bottom surface of the color filter unit are located in the two second regions respectively, while in the other of the two adjacent pixel electrodes in the second direction, two branches that are at the first distance from the bottom surface of the color filter unit are located in the two first regions respectively, and the other two branches that are at the second distance from the bottom surface of the color filter unit are located in the two second regions respectively.

Optionally, each of the pixel electrodes includes four branches, each of the branches includes a plurality of branch electrodes, and within each pixel electrode, orientations of the branch electrodes in any two branches are different, wherein in each of the four branches, each branch includes a first sub-branch and a second sub-branch, with the first sub-branch being at the first distance from the bottom surface of the color filter unit, and the second sub-branch being at the second distance from the bottom surface of the color filter unit; within each of the pixel electrodes, two of the second sub-branches are located on one side of the four first sub-branches, while the other two second sub-branches are located on an opposite side of the four first sub-branches, and these two second sub-branches are symmetrically arranged with respect to the other two second sub-branches.

Optionally, the second substrate includes the second organic insulating layer, the second organic insulating layer includes a plurality of third parts and a plurality of fourth parts, each of the third parts possesses a third thickness, and each of the fourth parts possesses a fourth thickness, with the third thickness being different from the fourth thickness.

In a second aspect, the present application provides a display device, which includes any display panel mentioned above.

The present application provides a display panel and a display device. The display panel includes a first substrate, a second substrate, and a light-modulating medium layer. The first substrate includes a first base and a pixel electrode layer set on one side of the first base. The light-modulating medium layer is positioned on a side of the pixel electrode layer that faces away from the first base. The second substrate is set on a side of the light-modulating medium layer that faces away from the first substrate and includes a second base and a common electrode layer placed on a side of the second base facing the light-modulating medium layer. Additionally, the first substrate includes a first organic insulating layer placed between the first base and the pixel electrode layer. This first organic insulating layer causes a surface of the pixel electrode layer facing away from the first base to be uneven. Alternatively, the second substrate includes a second organic insulating layer placed between the second base and the common electrode layer. This second organic insulating layer causes a surface of the common electrode layer facing away from the second base to be uneven. The display panel and the display device provided by the present application can improve the display effects at wide viewing angles while maintaining a high aperture ratio, high light transmittance, and low power consumption.

BRIEF DESCRIPTION OF DRAWINGS

To more clearly illustrate the technical solutions in the embodiments of this application, the drawings used in the description of the embodiments will be briefly introduced below. It is evident that the drawings described below are only some embodiments of this application, and for those skilled in the art, other drawings can be obtained from these drawings without creative efforts.

DESCRIPTION OF REFERENCE NUMERALS IN THE DRAWINGS first substrate 10; pixel electrode layer 11; pixel electrode 110; trunk part 111; branch 112; first type branch 1121; second type branch 1122; branch electrode 113; first sub-branch 114; second sub-branch 115; first organic insulating layer 12; first part 121; second part 122; driving circuit layer 13; thin-film transistor 131; color filter layer 14; color filter unit 141; first color filter unit 142; second color filter unit 143; third color filter unit 144; first base 15; second substrate 20; common electrode layer 21; second base 22; second organic insulating layer 23; third part 231; fourth part 232; light-modulating medium layer 30; backlight module 40; first direction X; second direction Y; first distance d1; second distance d2; first thickness h1; second thickness h2; third thickness h3; fourth thickness h4; first region q1; second region q2.

DETAILED DESCRIPTION OF EMBODIMENTS

In the following, the technical solutions in the present application are described clearly and completely in conjunction with the accompanying drawings and with reference to specific embodiments. It is apparent that the embodiments described here represent only a portion of the embodiments of this application, not all of them. Based on the embodiments in this application, all other embodiments obtained by those skilled in the art without making creative efforts fall within the scope of protection of this application. Furthermore, it should be understood that the specific embodiments described here are only for the purpose of illustration and explanation of this application and are not intended to limit the application. In this application, unless stated otherwise, orientation terms such as "upper" and "lower" typically refer to the upper and lower parts of the device in its actual use or working state, specifically the directions shown in the drawings; "inside" and "outside" refer to the contour of the device.

The disclosure below provides many different embodiments or examples to implement various structures of this application. To simplify the disclosure, specific components and arrangements in particular examples are described in the text. These are merely examples, and their purpose is not to limit the scope of this application. Additionally, the application may repeat reference numbers and/or letters across different examples. Such repetition is intended for simplicity and clarity, and does not imply a relationship between the various discussed embodiments and/or setups. Moreover, the application provides examples of specific techniques and materials, but those skilled in the art can recognize the applicability of other techniques and/or the use of other materials. The detailed descriptions follow, noting that the order of description of the following examples does not imply a preferred order of the embodiments.

In conventional technology, pixel electrodes corresponding to four-domain sub-pixels include four branches, each branch containing multiple branch electrodes; whereas the pixel electrodes for eight-domain sub-pixels include eight branches, each branch also containing multiple branch electrodes. Clearly, eight-domain sub-pixels, through a design involving more branches, can better address the issue of poor viewing angles caused by differences in the optical path length of liquid crystals observed from different directions, thereby enhancing the display effects at wide viewing angles. However, the non-transparent area of eight-domain sub-pixels is larger, due to reasons including a greater number of thin-film transistors, which act as switching and/or driving components, and more complex layouts of opaque metal wiring.

Therefore, the display panels in conventional technologies face the challenge of improving the display effects at wide viewing angles without being able to simultaneously maintain a high aperture ratio, high light transmittance, and low power consumption.

To address the issue of improving the display effects at wide viewing angles while also considering a high aperture ratio, high light transmittance, and low power consumption, the present application provides a display panel and a display device.

First Embodiment

Figure 1:
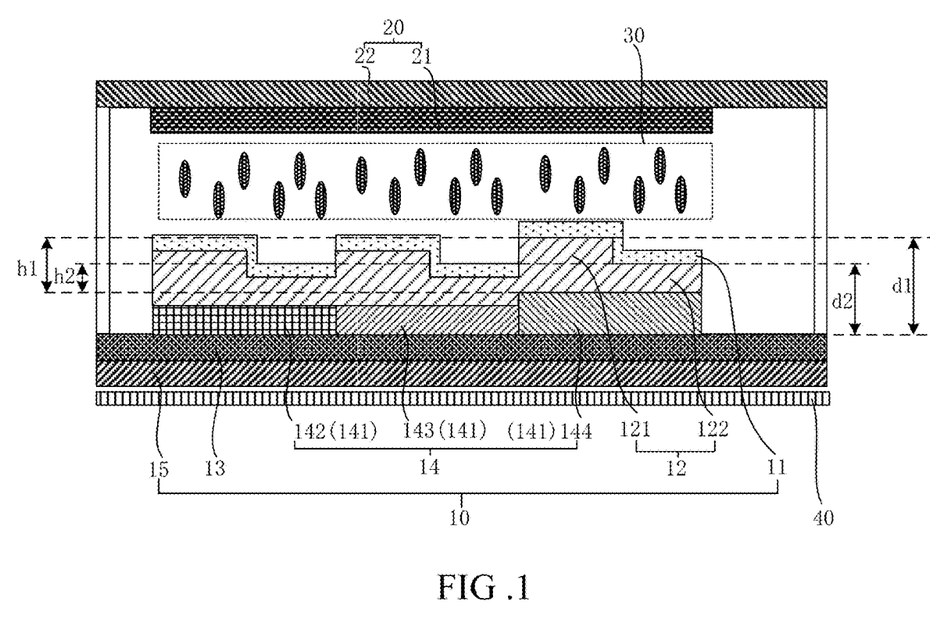
FIG. 1 is a schematic cross-sectional view of a display panel according to some embodiments of the present application.
Figure 2:
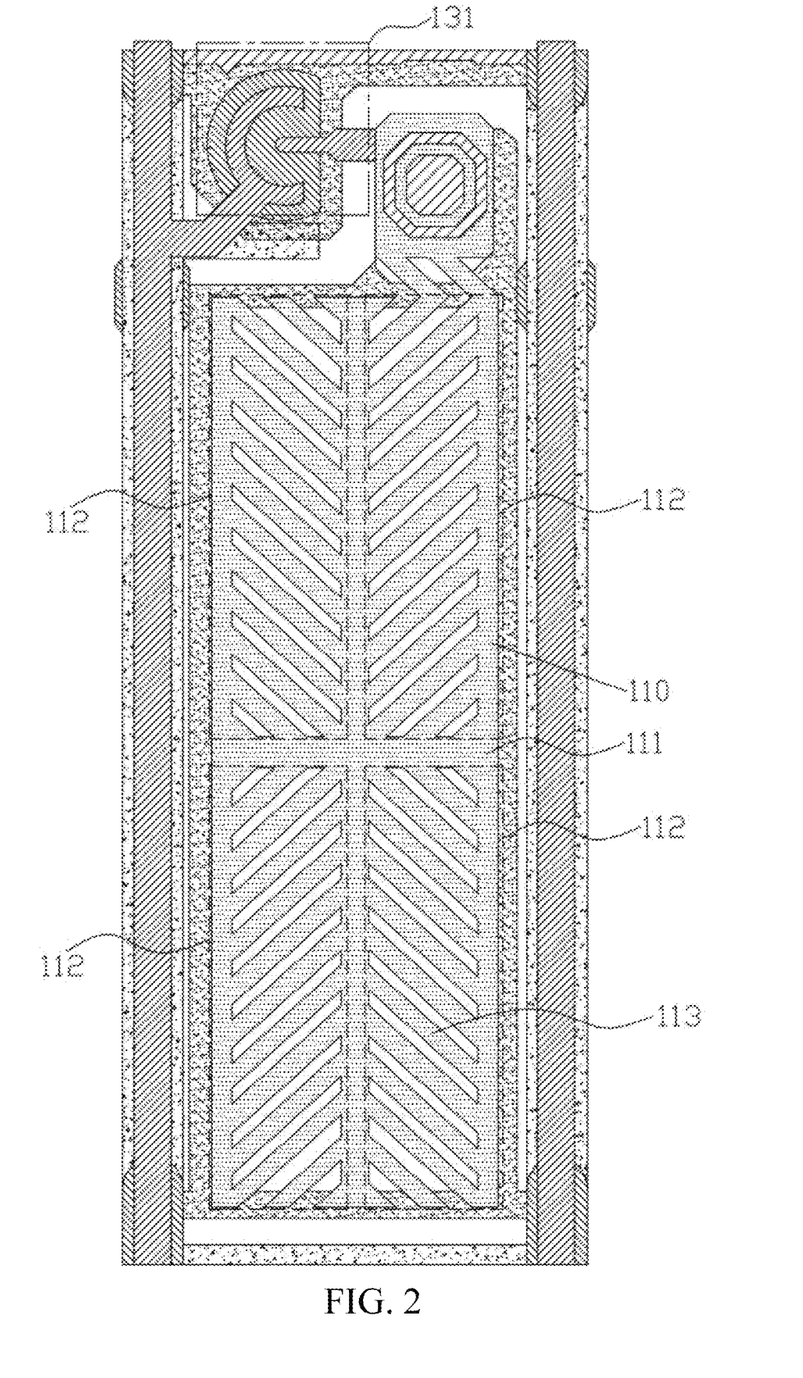
FIG. 2 is a schematic plan view of a sub-pixel area in the display panel according to some embodiments of the present application.

FIG. 1 shows a schematic cross-sectional view of the display panel according to some embodiments. FIG. 2 is a schematic plan view of a sub-pixel area of a display panel according to some embodiments of this application. In conjunction with FIGS. 1 and 2, a first aspect of this application provides a display panel, which can be a liquid crystal display panel or other types of display panels that operate on a similar principle to liquid crystal display panels.

In some embodiments of the present application, the display panel includes a first substrate 10, a second substrate 20, and a light-modulating medium layer 30. The first substrate 10 includes a first base 15 and a pixel electrode layer 11 located on one side of the first base 15. The light-modulating medium layer 30 is situated on one side of the pixel electrode layer 11 that faces away from the first base 15. The second substrate 20 is positioned on one side of the light-modulating medium layer 30 that faces away from the first substrate 10. This second substrate 20 includes a second base 22 and a common electrode layer 21 set on one side of the second base 22 facing the light-modulating medium layer 30. Additionally, the first substrate 10 also includes a first organic insulating layer 12 which is placed between the first base 15 and the pixel electrode layer 11. The first organic insulating layer 12 creates an uneven surface on the side of the pixel electrode layer 11 that is away from the first base 15.

In the display panel provided by this application, when the first substrate 10 includes the first organic insulating layer 12, the first organic insulating layer 12 can make a surface of the pixel electrode layer 11 on the side facing away from the first base 15 uneven. This unevenness allows for different distances between the pixel electrode layer 11 and the common electrode layer 21 in different areas. Consequently, when a certain voltage is applied to the pixel electrode layer 11 and another voltage to the common electrode layer 21, a deflection angle of a light-modulating medium in the light-modulating medium layer 30 corresponding to one area can differ from a deflection angle of the light-modulating medium in the light-modulating medium layer 30 in another area. This variation in deflection angles enables the display panel to enhance the display effects at wide viewing angles while maintaining a high aperture ratio, high light transmittance, and low power consumption.

In some embodiments of this application, the first substrate 10 includes a color filter layer 14. The first organic insulating layer 12 is positioned between the color filter layer 14 and the pixel electrode layer 11. The color filter layer 14 includes a plurality of color filter units 141. The pixel electrode layer 11 includes a plurality of pixel electrodes 110. Each pixel electrode 110 is correspondingly aligned with a color filter unit 141. Optionally, the common electrode layer 21 has a flat surface, which allows the distance between different areas of each pixel electrode 110 and a corresponding bottom surface of the color filter unit 141 to reflect the distance between the respective areas of the pixel electrode 110 and the common electrode layer 21. It should be noted that a bottom surface of the color filter unit 141 is a side of the color filter unit 141 that is closer to the first base 15.

The following description is provided given that the common electrode layer 21 has a flat surface.

In some embodiments of this application where the common electrode layer 21 has a flat surface, each pixel electrode 110 includes multiple branches 112. Within each pixel electrode 110, at least part of one branch 112 is at a first distance d1 from the bottom surface of the corresponding color filter unit 141, while at least part of another branch 112 is at a second distance d2 from the same bottom surface of the corresponding color filter unit 141. Importantly, this first distance d1 is different from the second distance d2.

In the display panel provided by this application, since within each pixel electrode 110, at least part of one branch 112 is at the first distance d1 from the bottom surface of the color filter unit 141, and at least part of another branch 112 is at the second distance d2 from the same bottom surface, and given that the first distance d1 is different from the second distance d2, when a certain pixel voltage is applied to the pixel electrode 110 and a certain common voltage is applied to the common electrode layer 21, a voltage difference between the part of the branch 112 at the first distance d1 and the common electrode layer 21 can be different from a voltage difference between the part of the branch 112 at the second distance d2 and the common electrode layer 21. Consequently, the control capability of the part of the branch 112 at the first distance d1 over the light-modulating medium in the light-modulating medium layer 30 can differ from the control capability of the part of the branch 112 at the second distance d2 over the light-modulating medium in the light-modulating medium layer 30. Thus, without changing the design of the pixel electrode 110 or increasing the number of domains, while maintaining a high aperture ratio, high light transmittance, and low power consumption, this approach effectively improves the poor viewing angle performance caused by differences in the optical path length of the light-modulating medium observed from various directions, thereby enhancing the display effects at wide viewing angles.

It should be noted that in other embodiments of this application, at least part of other branches 112 can be at a distance from the bottom surface of the color filter unit 141 that is different from the first distance d1 and the second distance d2, such as a third distance, a fourth distance, a fifth distance, etc. The overall inventive concept remains the same as the examples described above, and is not elaborated further in this application.

Additionally, each pixel electrode 110 also includes a trunk part 111. The trunk part 111 includes a first main trunk set along a first direction X and a second main trunk set along a second direction Y. The orientation of the branch electrodes 113 indicates the direction of extension from the end near the trunk part 111 to which they are connected towards the end far from the trunk part 111.

In some embodiments of this application, a difference between the first distance d1 and the second distance d2 is greater than or equal to 0.1 micrometers.

The applicant has found that when the difference between the first distance d1 and the second distance d2 is too small, the effect of improving the poor viewing angle performance caused by differences in the optical path length of the light-modulating medium as observed from different directions is not significant. As a result, the display performance at wider viewing angles (for example, where the angle between the viewing direction and the normal to an emitting surface is greater than) 75° cannot be noticeably improved. Therefore, this application controls the difference between the first distance d1 and the second distance d2 to be more than 0.1 micrometers.

In some embodiments of this application, the difference between the first distance d1 and the second distance d2 is less than or equal to 1 micrometer.

The applicant has discovered that when the difference between d1 and d2 exceeds a certain threshold, the effect of addressing the poor viewing angle performance caused by differences in the optical path length of the light-modulating medium observed from various directions becomes less pronounced, and it also increases the overall thickness of the display panel and the complexity of the manufacturing process. Therefore, this application keeps the difference between the first distance d1 and the second distance d2 controlled at less than 1 micrometer.

In some embodiments of this application, the first substrate 10 includes a driving circuit layer 13 and a color filter layer 14. Certainly, in other embodiments of this application, the driving circuit layer 13 and/or the color filter layer 14 can also be positioned on the second substrate 20.

In some embodiments of this application, the first organic insulating layer 12 is positioned on one side of the pixel electrode layer 11 that is away from the light-modulating medium layer 30. The first organic insulating layer 12 includes multiple first parts 121 and multiple second parts 122. The first part 121 has a first thickness h1, and the second part 122 has a second thickness h2, with the first thickness h1 being different from the second thickness h2. A part of one branch 112 at the first distance d1 from the bottom surface of the color filter unit 141 is disposed corresponding to the first part 121. Meanwhile, a part of another branch 112 at the second distance d2 from the bottom surface of the color filter unit 141 is disposed corresponding to the second part 122.

In the display panel provided by this application, the first organic insulating layer 12 is positioned on one side of the pixel electrode layer 11 that is away from the light-modulating medium layer 30. A shape of the first organic insulating layer 12 can influence a surface condition of the pixel electrode 110, thereby resulting each pixel electrode 110 having at least part of one branch 112 at a first distance d1 from the bottom surface of the color filter unit 141, and at least part of another branch 112 of the pixel electrode 110 at a second distance d2 from the bottom surface of the color filter unit 141.

In some embodiments of the present application, the first organic insulating layer 12 is made of an organic material, such as positive or negative photoresist.

In some embodiments, the present application can utilize a half-tone mask process to form the first organic insulating layer 12 with multiple first parts 121 having a first thickness h1 and multiple second parts 122 having a second thickness h2. This process enables the formation of a step at the junction between the first part 121 and the second part 122. Utilizing the difference in thickness between the first part 121 and the second part 122, at least part of one branch 112 of each pixel electrode 110 can be positioned at a first distance d1 from the bottom surface of the color filter unit 141, and at least part of another branch 112 can be at a second distance d2 from the bottom surface of the color filter unit 141.

In some embodiments of this application, the first substrate 10 includes sequentially stacked layers including a first base 15, a driving circuit layer 13, a color filter layer 14, a first organic insulating layer 12, and a pixel electrode layer 11. The color filter layer 14 includes a plurality of color filter units 141, each corresponding to one pixel electrode 110 and one sub-pixel. Each color filter unit 141 has a light-transmitting area, and a surface of each color filter unit 141 that is away from the first base 15 is flat in this light-transmitting area. This flatness allows the shape and surface texture of the first organic insulating layer 12, situated on the color filter unit 141 in the light-transmitting area, to directly influence the distance between the pixel electrode 110 and the bottom surface of the color filter unit 141. Consequently, by forming the first parts 121 and the second parts 122, it is possible to ensure that in each pixel electrode 110, at least part of one branch 112 of is at a first distance d1 from the bottom surface of the color filter unit 141, while at least part of another branch 112 is at a second distance d2 from the bottom surface of the color filter unit 141.

In some embodiments of this application, the color filter units 141 include a plurality of first color filter units 142, a plurality of second color filter units 143, and a plurality of third color filter units 144. The color filter units 142, the color filter units 143, and the color filter units 144 differ in their light-transmitting colors. For example, the first color filter unit 142 is a red filter, the second color filter unit 143 is a green filter, and the third color filter unit 144 is a blue filter. In this setup, the first color filter unit 142 and the second color filter unit 143 have a same thickness, which is less than a thickness of the third color filter unit 144.

In some embodiments of this application, the first substrate 10 also includes a plurality of thin-film transistors (TFTs) 131. In each pixel electrode 110, all the branch electrodes 113 within all the branches 112 are electrically connected to a single thin-film transistor 131.

In the display panel provided by this application, the branch electrodes 113 in all the branches 112 of each pixel electrode 110 are electrically connected to one single thin-film transistor 131. This means that all the branch electrodes 113 in all the branches 112 of each pixel electrode 110 are controlled by one single thin-film transistor 131, ensuring that the branches 112 within each pixel electrode 110 are controlled by one pixel drive signal. This configuration simplifies the driving requirements and reduces the number of thin-film transistors required. Since the thin-film transistors 131 include numerous opaque metal structures, reducing the number of thin-film transistors 131 can effectively increase the aperture ratio and light transmittance of the display panel, and decrease the power consumption of the display.

Figure 3:
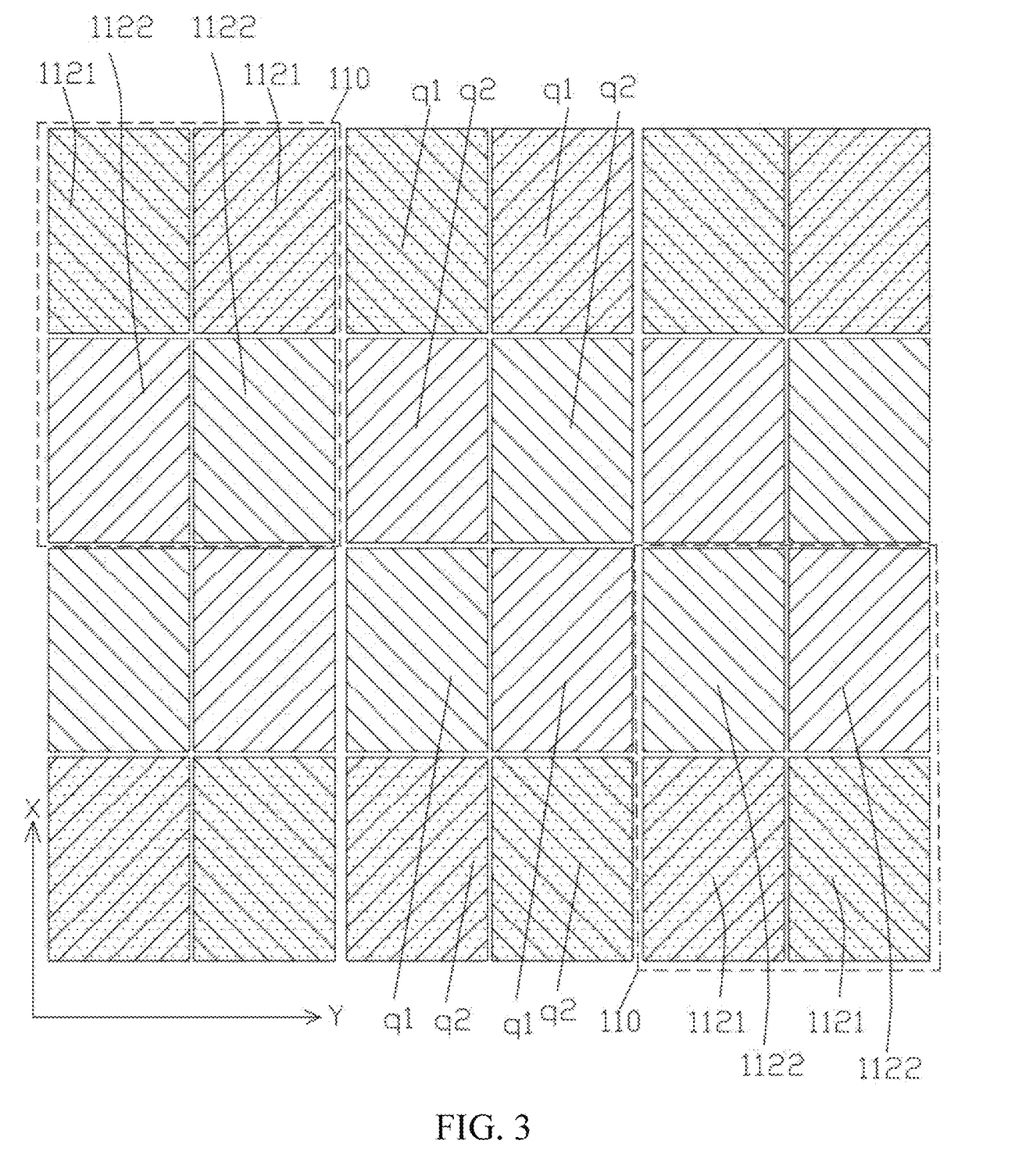
FIG. 3 is a schematic plan view showing a configuration of multiple branches of six pixel electrodes according to some embodiments of the present application.
Figure 4:
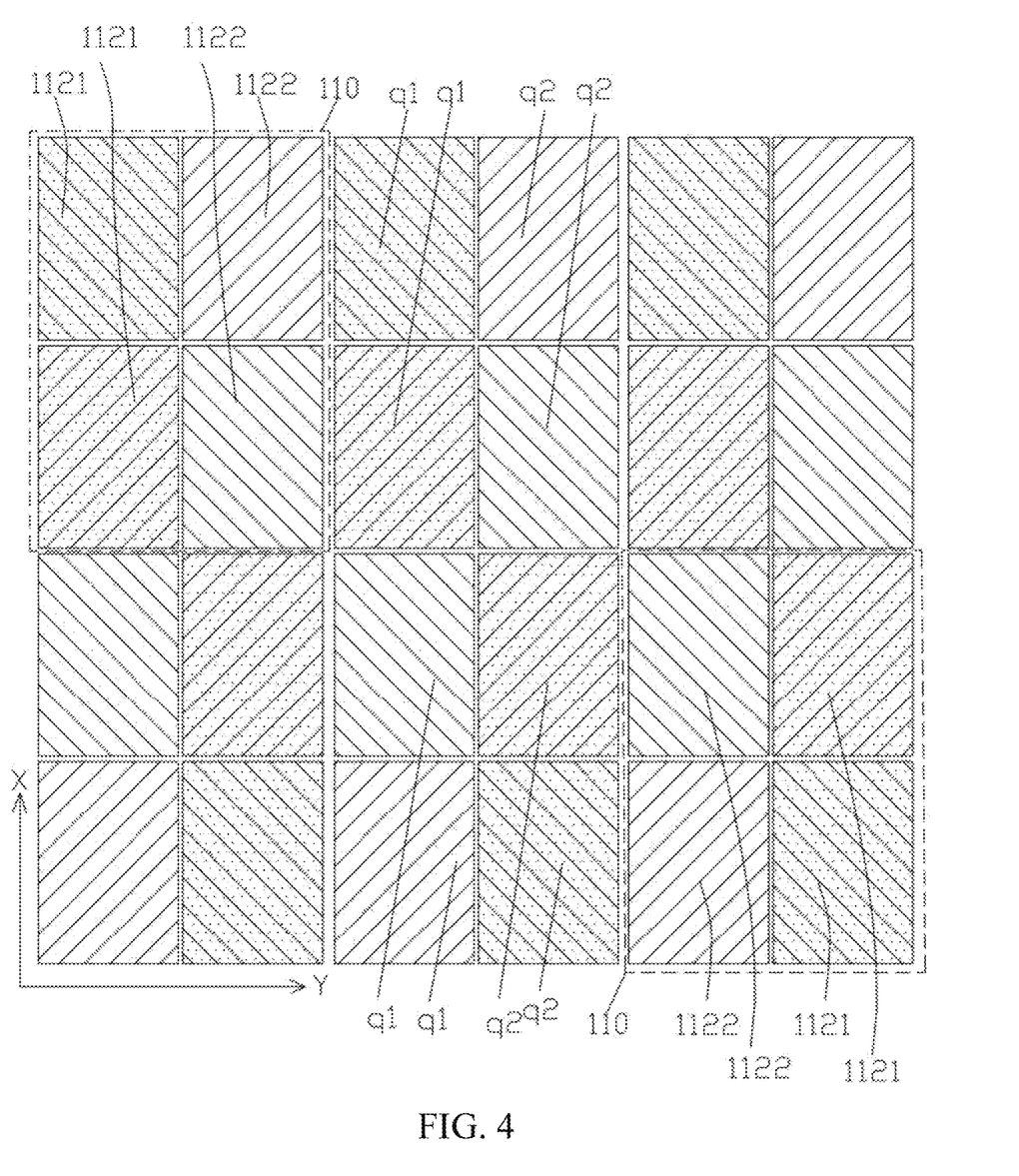
FIG. 4 is another schematic plan view showing a different configuration of the multiple branches of six pixel electrodes according to some embodiments of the present application.
Figure 5:
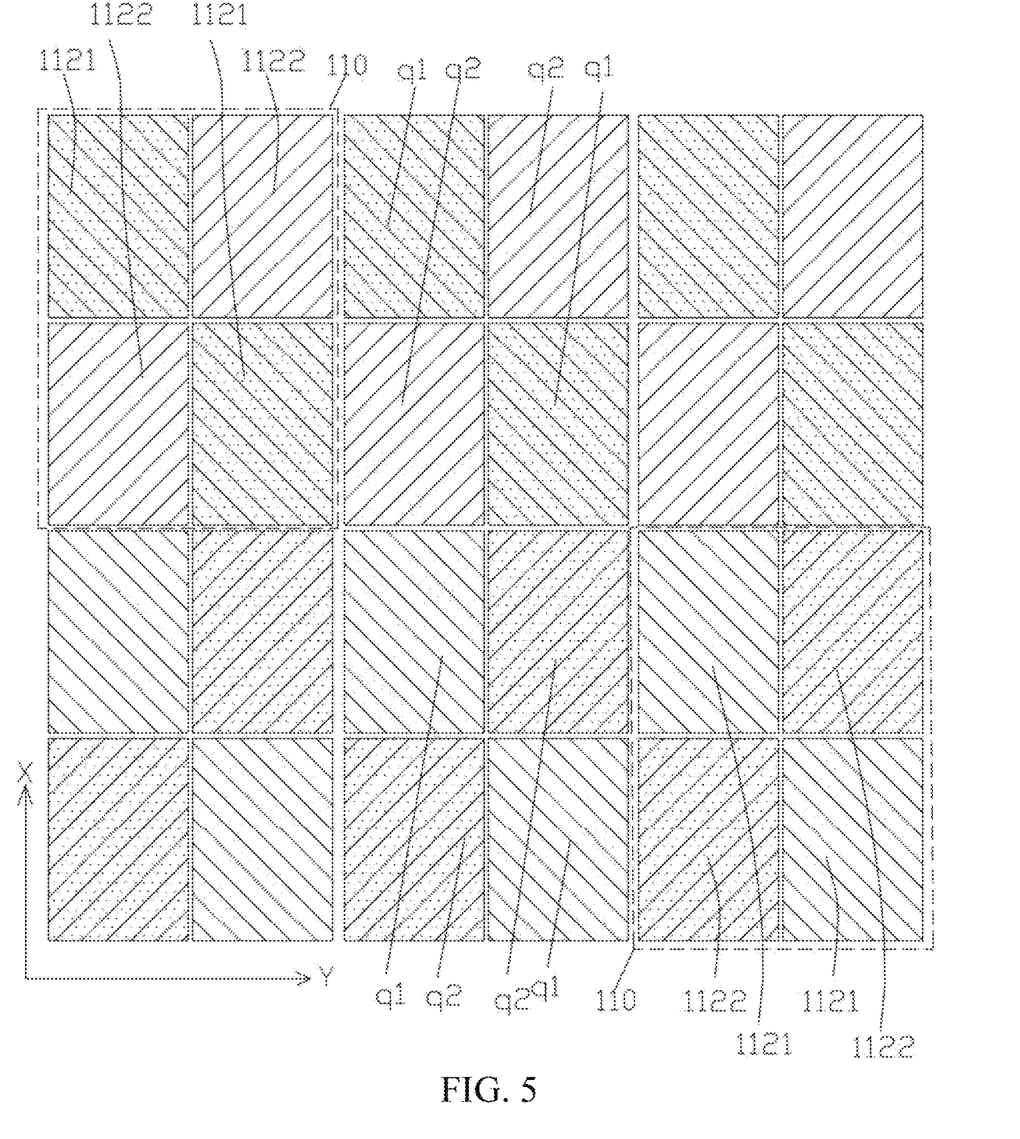
FIG. 5 is yet another schematic plan view showing an alternative configuration of the multiple branches of six pixel electrodes according to some embodiments of the present application.

FIG. 3 is a schematic plan view showing the arrangement of multiple branches of six pixel electrodes according to some embodiments of this application; FIG. 4 is another schematic plan view depicting a different arrangement of the multiple branches of six pixel electrodes according to some embodiments of this application; and FIG. 5 is yet another schematic plan view illustrating an alternative distribution of the multiple branches of six pixel electrodes according to some embodiments of this application. Referring to FIGS. 3, 4, and 5, in some embodiments of this application, each pixel electrode 110 includes four branches 112, each branch 112 including a plurality of branch electrodes 113. In each pixel electrode 110, the orientations of the branch electrodes 113 in any two branches 112 are different; where in the four branches 112 of each pixel electrode 110, two of the branches 112 are at the first distance d1 from the bottom surface of the color filter unit 141, and the other two branches 112 are at the second distance d2 from the bottom surface of the color filter unit 141.

For clarity and explanation purposes, this application defines that within each pixel electrode 110, the branches 112 at the first distance d1 from the bottom surface of the color filter unit 141 are categorized as first type branches 1121, and the branches 112 at the second distance d2 from the bottom surface of the color filter unit 141 are categorized as second type branches 1122.

In the display panel provided by the present application, each pixel electrode 110 includes four branches 112, meaning that the sub-pixels in the display are designed with four domains. Additionally, since each pixel electrode 110 includes both the first type branches 1121 and the second type branches 1122, which are at different distances from the common electrode layer 21, this application is able to achieve the superior wide-angle display performance typically only possible with eight-domain designs on the basis of a four-domain design. Of course, in other embodiments of this application, each pixel electrode 110 can also include six branches 112, eight branches 112, etc., which are not elaborated further in this application.

Additionally, in the display panel provided by this application, since two of the four branches 112 within each pixel electrode 110 are at the first distance d1 from the bottom surface of the color filter unit 141, and the other two branches 112 are at the second distance d2 from the bottom surface of the color filter unit 141, this setup allows for the four branches 112 of the pixel electrode 110 to be evenly divided. This division groups two branches 112 together, each group sharing the same first distance d1 relative to the common electrode layer 21. The other two branches 112 are grouped together at the same second distance d2 relative to the common electrode layer 21. This configuration improves the wide-angle display performance while ensuring uniformity in the display. It also simplifies the fabrication process, which in turn reduces production and manufacturing costs.

Referring to FIG. 3, in some embodiments of the present application, the pixel electrodes 110 are arranged sequentially in the first direction X and the second direction Y. Within each pixel electrode 110, two branches 112 at the first distance d1 from the bottom surface of the color filter unit 141 (that is, two first type branches 1121) are adjacent in the second direction Y. Additionally, the other two branches 112, which are at the second distance d2 from the bottom surface of the color filter unit 141 (that is, two second type branches 1122), are also adjacent in the second direction Y.

In the display panel provided by this application, since within each pixel electrode 110, two branches 112 at the first distance d1 from the bottom surface of the color filter unit 141 are adjacent in the second direction Y, and the other two branches 112 at the second distance d2 are also adjacent in the second direction Y, it is possible to continuously arrange the two first parts 121 of the first organic insulating layer 12, as well as the two second parts 122 of the first organic insulating layer 12. This continuity reduces the complexity of preparing the first organic insulating layer 12 and lowers the production and manufacturing costs associated with the halftone mask.

Referring to FIG. 4, in some embodiments of this application, multiple pixel electrodes 110 are arranged sequentially in both the first direction X and the second direction Y. Within each pixel electrode 110, two branches 112 at the first distance d1 from the bottom surface of the color filter unit 141 (namely two first type branches 1121) are adjacent in the first direction X, and the other two branches 112 at the second distance d2 (namely two second type branches 1122) are also adjacent in the first direction X.

In the display panel provided by this application, since within each pixel electrode 110, two branches 112 at the first distance d1 from the bottom surface of the color filter unit 141 are adjacent in the first direction X, and the other two branches 112 at the second distance d2 are also adjacent in the first direction X, it allows for the two first parts 121 of the first organic insulating layer 12 to be arranged continuously, and similarly allows for the two second parts 122 of the first organic insulating layer 12 to be arranged continuously. This continuity simplifies the preparation of the first organic insulating layer 12 and reduces the production and manufacturing costs related to the halftone mask.

Referring to FIG. 5, in some embodiments of this application, within each pixel electrode 110, two branches 112 at the first distance d1 from the bottom surface of the color filter unit 141 (namely two first type branches 1121) are not adjacent in both the first direction X and the second direction Y. Similarly, the other two branches 112 at the second distance d2 (namely two second type branches 1122) from the bottom surface of the color filter unit 141 are not adjacent in both the first direction X and the second direction Y.

In the display panel provided by this application, since within each pixel electrode 110, two branches 112 at the first distance d1 and two branches 112 at the second distance d2 are not adjacent in both the first direction X and the second direction Y, it allows for a better improvement of the viewing angle issues caused by differences in the optical path length of the liquid crystals observed from various directions.

Continuing to refer to FIGS. 3, 4, and 5, in some embodiments of the present application, the pixel electrodes 110 are sequentially arranged in the first direction X. Each pixel electrode 110 is divided into two first regions q1 and two second regions q2. In one of two adjacent pixel electrodes 110 in the first direction X, the two branches 112 at the first distance d1 from the bottom surface of the color filter unit 141 (namely two first type branches 1121) are located in the two first regions q1, and the other two branches 112 at the second distance d2 from the bottom surface of the color filter unit 141 (namely two second type branches 1122) are located in the two second regions q2. In the other of the two adjacent pixel electrodes 110 in the first direction X, the two branches 112 at the first distance d1 from the bottom surface of the color filter unit 141 (namely two first type branches 1121) are located in the two second regions q2, and the two branches 112 at the second distance d2 from the bottom surface of the color filter unit 141 (namely two second type branches 1122) are located in the two first regions q1.

In the display panel provided by the present application, the positions of the first region q1 and the second region q2 of each pixel electrode 110 are fixed. In two adjacent pixel electrodes 110 in the first direction X, the branches 112 in the first region q1 of one pixel electrode 110 are at the first distance d1 from the bottom surface of the color filter unit 141, while the branches 112 in the first region q1 of the other pixel electrode 110 are at the second distance d2 from the bottom surface of the color filter unit 141. This setup allows for different distances between the branches 112 in the same region (either first region q1 or second region q2) of two adjacent pixel electrodes 110 in the first direction X, thereby enhancing the symmetry of viewing angles for the user and further improving the display performance of the display panel.

In some embodiments of this application, the sub-pixels corresponding to two adjacent pixel electrodes 110 in the first direction X have the same color, and the corresponding color filter units 141 also have the same color.

In the display panel provided by the present application, since the colors of the sub-pixels corresponding to two adjacent pixel electrodes 110 in the first direction X are the same, the colors of the corresponding color filter units 141 are also the same. This application further differentiates the design of the branches 112 in two adjacent pixel electrodes 110 in the first direction X. This differentiation is aimed to ensure that the liquid crystal molecules on one side of the branches 112 in the same region of two adjacent pixel electrodes 110 exhibit different tilt angles, thereby further enhancing the display performance at wide viewing angles.

Continuing to refer to FIGS. 3, 4, and 5, in some embodiments of this application, in one of two adjacent pixel electrodes 110 in the second direction Y, two branches 112 at the first distance d1 from the bottom surface of the color filter unit 141 (namely two first type branches 1121) are located in the two first regions q1, and two other branches 112 at the second distance d2 from the bottom surface of the color filter unit 141 (namely two second type branches 1122) are located in the two second regions q2. In the other of the two adjacent pixel electrodes 110 in the second direction Y, two branches 112 at the first distance d1 from the bottom surface of the color filter unit 141 (namely two first type branches 1121) are located in the two first regions q1, and two other branches 112 at the second distance d2 from the bottom surface of the color filter unit 141 (namely two second type branches 1122) are located in the two second regions q2.

In the display panel provided by this application, the positions of the first region q1 and the second region q2 of each pixel electrode 110 are fixed. Due to the branches 112 in the first region q1 of one of the pixel electrodes 110 in two adjacent ones in the second direction Y being at a first distance d1 from the bottom surface of the color filter unit 141, and the branches 112 in the first region q1 of the other adjacent pixel electrode 110 also being at the first distance d1 from the bottom surface of the color filter unit 141, this arrangement ensures that the distance between the branches 112 in the same region (either the first region q1 or the second region q2) and the bottom surface of the color filter unit 141 is the same in two adjacent pixel electrodes 110 in the second direction Y. This consistency allows for a more repetitive design of the branches 112 in the pixel electrodes 110 along the second direction Y, thereby reducing the complexity of the process and lowering production and manufacturing costs.

In some embodiments of this application, the colors of the sub-pixels corresponding to two adjacent pixel electrodes 110 in the second direction Y are different, as are the colors of the corresponding color filter units 141.

In the display panel provided by this application, since the colors of the sub-pixels corresponding to two adjacent pixel electrodes 110 in the second direction Y are different, when the distance between the branches 112 in the same region (either the first region q1 or the second region q2) and the bottom surface of the color filter unit 141 is the same in two adjacent pixel electrodes 110, it allows for the liquid crystal molecules on one side of the branches 112 in the same region of adjacent pixel electrodes 110 to exhibit the same tilt angle when different colored sub-pixels within the same pixel unit illuminate simultaneously. This configuration enhances the display performance of the display panel.

In some embodiments of this application, the display panel further includes a backlight module 40. The backlight module 40 is positioned on one side of the first substrate 10 away from the second substrate 20. The backlight module 40 includes a backlight source, which can be a direct-type backlight source. In other embodiments of this application, the backlight source can also be an edge-type backlight source.

In a second aspect, the present application further provides a display device that includes a housing and any one of the aforementioned display panels. The housing has an accommodation space, and the display panel is disposed in the accommodation space.

Second Embodiment

Figure 6:
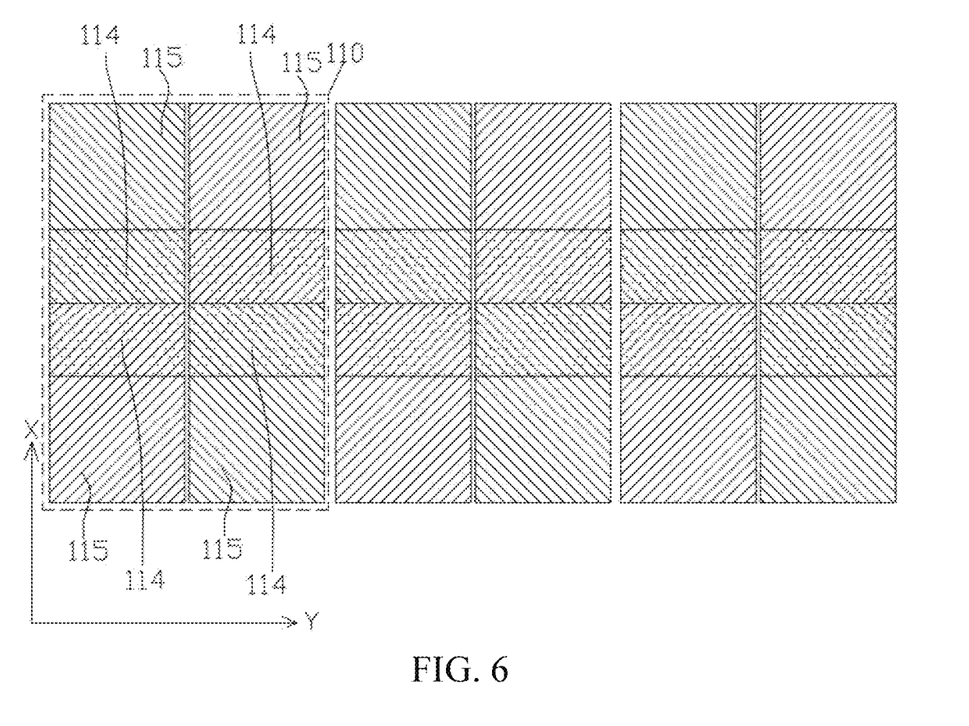
FIG. 6 is a schematic plan view of multiple branches of three pixel electrodes according to some embodiments of the present application.
Figure 7:
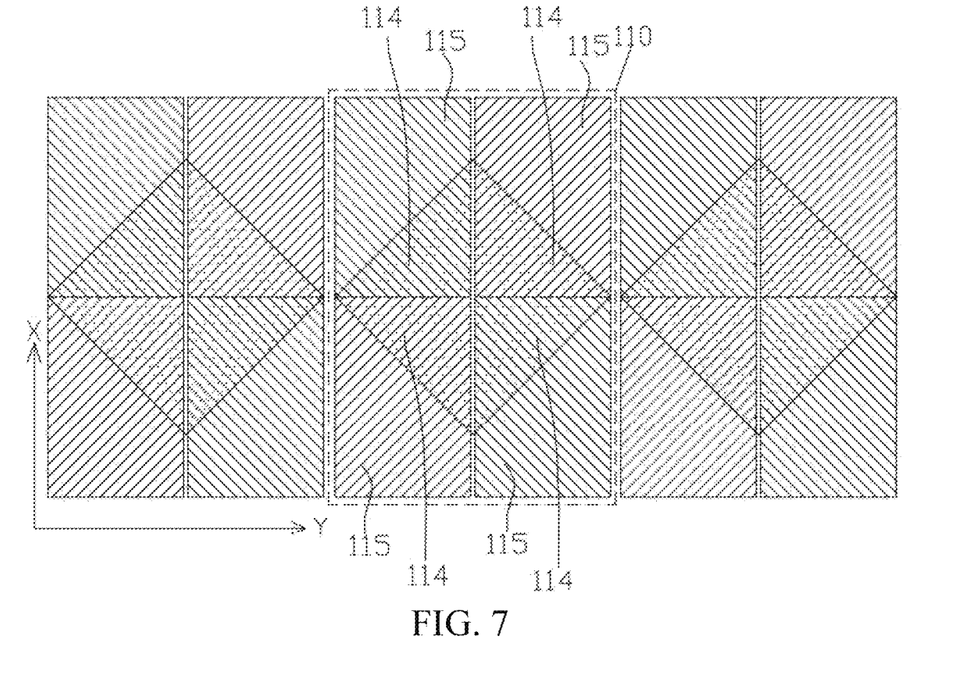
FIG. 7 is another plan schematic view of the multiple branches of three pixel electrodes according to some embodiments of the present application.

FIG. 6 shows a schematic plan view of multiple branches of three pixel electrodes according to some embodiments of the present application; FIG. 7 shows another schematic plan view of the multiple branches of three pixel electrodes according to some embodiments of this application. In conjunction with FIGS. 1, 2, 6, and 7, a first aspect of the second embodiment provided in this application provides a display panel. The display panel includes a first substrate 10, a second substrate 20, and a light-modulating medium layer 30. The first substrate 10 includes a first base 15 and a pixel electrode layer 11 positioned on one side of the first base 15. The light-modulating medium layer 30 is set on one side of the pixel electrode layer 11 that faces away from the first base 15. The second substrate 20 is disposed on one side of the light-modulating medium layer 30 that faces away from the first substrate 10, and includes a second base 22 and a common electrode layer 21 located on one side of the second base 22 facing the light-modulating medium layer 30. Additionally, the first substrate 10 further includes a first organic insulating layer 12. The first organic insulating layer 12 is positioned between the first base 15 and the pixel electrode layer 11. The first organic insulating layer 12 causes a surface of the pixel electrode layer 11 facing away from the first base 15 to be uneven.

It should be noted that the structure of the display panel provided in the second embodiment of this application is similar to the structure of the display panel provided in the first embodiment. For example, the common electrode layer 21 has a flat surface, and the first substrate 10 includes a color filter layer 14. The first organic insulating layer 12 is positioned between the color filter layer 14 and the pixel electrode layer 11. The color filter layer 14 includes a plurality of color filter units 141, and the pixel electrode layer 11 includes a plurality of pixel electrodes 110, the pixel electrodes 110 are arranged corresponding to the color filter units 141 in a one-to-one correspondence. Each pixel electrode 110 includes multiple branches 112, and within each pixel electrode 110, at least part of one branch 112 is at a first distance d1 from the bottom surface of the color filter unit 141, while at least part of another branch 112 is at a second distance d2 from the bottom surface of the color filter unit 141, with the first distance d1 being different from the second distance d2. The second embodiment does not reiterate the parts that are the same.

Referring to FIGS. 6 and 7, in some embodiments of the present application, each pixel electrode 110 includes four branches 112, each containing multiple branch electrodes 113, and within each pixel electrode 110, the orientations of the branch electrodes 113 in any two branches 112 are different. Each of the four branches 112 includes a first sub-branch 114 and a second sub-branch 115, with the first sub-branch 114 being at the first distance d1 from the bottom surface of the color filter unit 141, and the second sub-branch 115 being at the second distance d2 from the bottom surface of the color filter unit 141. Within each pixel electrode 110, two of the second sub-branches 115 are located on one side of the four first sub-branches 114, while the other two second sub-branches 115 are located on the opposite side of the four sub-branches 114, and the two second sub-branches 115 are symmetrically arranged in relation to the other two second sub-branches 115.

In the display panel provided by this application, since each branch 112 includes a first sub-branch 114 and a second sub-branch 115, with the first sub-branch 114 at the first distance d1 from the bottom surface of the color filter unit 141, and the second sub-branch 115 at the second distance d2 from the bottom surface of the color filter unit 141, the precision of control over the corresponding liquid crystal molecules by each branch 112 is enhanced, thereby further improving the display performance at wide viewing angles.

At the same time, by positioning two of the second sub-branches 115 on one side of the four first sub-branches 114, and the other two second sub-branches 115 on the opposite side of the branches, and arranging these two second sub-branches 115 symmetrically with respect to the other two second sub-branches 115 within each pixel electrode 110, the display panel provided in the second embodiment can use the pixel electrode 110 as the smallest repeating unit. This arrangement ensures that within the same region of each pixel electrode 110, the branches 112 have the same distance to the common electrode, thereby simplifying the preparation of the first organic insulating layer 12 and reducing the production and manufacturing costs associated with the halftone mask.

It should be noted that using the pixel electrode 110 as the smallest repeating unit ensures that, whether it is between two pixel electrodes 110 corresponding to two same-color sub-pixels adjacent in the first direction X or between two pixel electrodes 110 corresponding to two different-color sub-pixels adjacent in the second direction Y, the branches 112 within the same region of each pixel electrode 110 have the same distance to the common electrode.

In some embodiments of the present application, within each pixel electrode 110, a total area of the four first sub-branches 114 is denoted as a, and a total area of the four second branches 112 is denoted as b. The ratio of a to b is within the range of 1/2 to 1.

In the display panel provided by this application, since the ratio of the total area of the four first sub-branches 114 to a total area of the four second branches 112 is above 1/2, it prevents the issue of increased manufacturing complexity due to the first sub-branches 114 being too small in area. Moreover, since the ratio of the total area of the four first sub-branches 114 to the total area of the four second branches 112 is below 1, it prevents the potentially adverse effect on the arrangement of liquid crystal molecules in edge regions of the pixel electrode 110 that could occur if the area of the four clustered first sub-branches 114 is too large, thereby ensuring the display quality of the panel.

In the second aspect, the present application further provides a display device. The display device includes a housing and any one of the described display panels. The housing features an accommodation space in which the display panel is installed.

Third Embodiment

Figure 8:
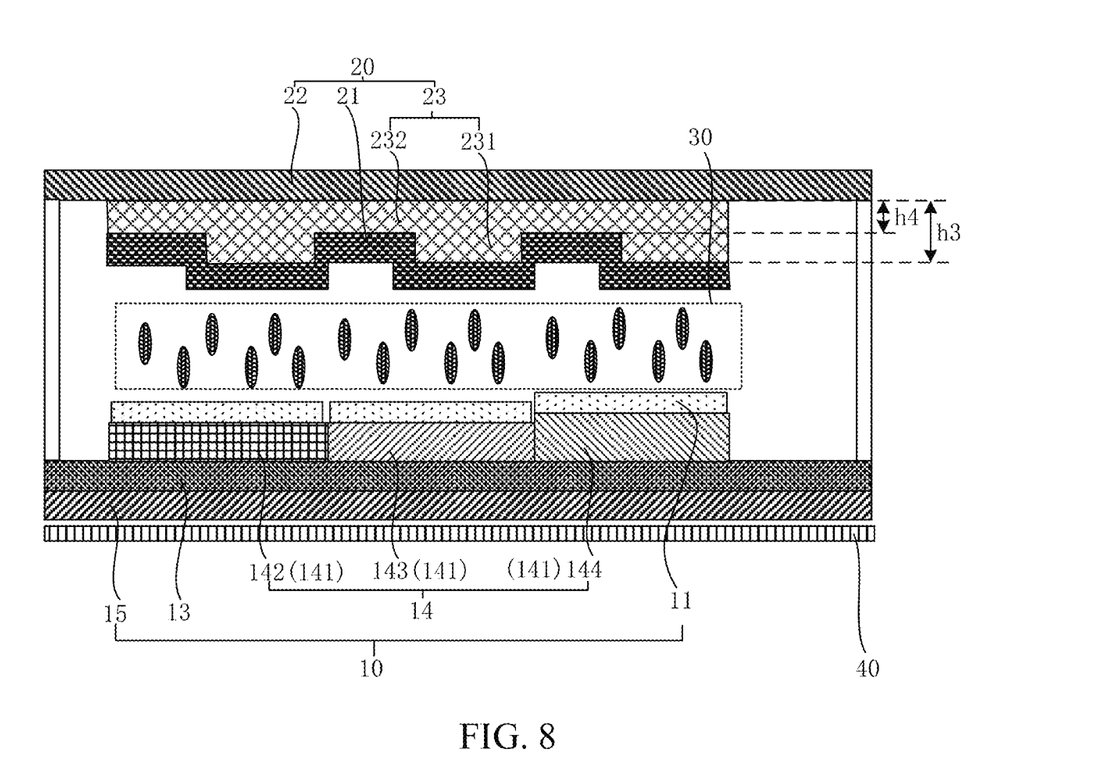
FIG. 8 is a schematic cross-sectional view of another type of display panel according to some embodiments of the present application.

FIG. 8 presents a schematic cross-sectional view of another type of display panel provided in some embodiments of this application. In conjunction with FIGS. 2-8, a first aspect of the third embodiment provides a display panel that includes a first substrate 10, a second substrate 20, and a light-modulating medium layer 30. The first substrate 10 includes a first base 15 and a pixel electrode layer 11 positioned on one side of the first base 15. The light-modulating medium layer 30 is set on one side of the pixel electrode layer 11 that faces away from the first base 15. The second substrate 20 is placed on one side of the light-modulating medium layer 30 that faces away from the first substrate 10. This second substrate 20 includes a second base 22 and a common electrode layer 21 located on one side of the second base 22 facing the light-modulating medium layer 30. Additionally, the second substrate 20 includes a second organic insulating layer 23. The second organic insulating layer 23 is positioned between the second base 22 and the common electrode layer 21. The second organic insulating layer 23 causes a surface of the common electrode layer 21 that faces away from the second base 22 to be uneven.

It should be noted that the structure of the display panel provided in the third embodiment of this application is similar to the structures provided in the first and second embodiments, such as the pixel electrode layer 11 including multiple pixel electrodes 110, each containing multiple branches 112. The third embodiment does not reiterate the parts that are the same; its main difference lies in the fact that the first substrate 10 in the third embodiment does not need a first organic insulating layer 12 that includes multiple first parts 121 and multiple second parts 122, and within the same pixel electrode 110, the distance between each branch 112 and the bottom surface of the color filter unit 141 is the same.

In some embodiments of this application, the second organic insulating layer 23 is positioned on one side of the common electrode layer 21 that faces away from the light-modulating medium layer 30. The second organic insulating layer 23 includes a plurality of third parts 231 and a plurality of fourth parts 232. The third part 231 has a third thickness h3, and the fourth part 232 has a fourth thickness h4, with the third thickness h3 being different from the fourth thickness h4. Wherein, at least part of one branch 112 at a first distance from the common electrode layer 21 is arranged to correspond to the third part 231, and at least part of another branch 112 at a second distance from the common electrode layer 21 is arranged to correspond to the fourth part 232.

In the display panel provided by this application, the second organic insulating layer 23 is positioned on one side of the common electrode layer 21 that is away from the light-modulating medium layer 30. The shape of the second organic insulating layer 23 can influence the surface state of the common electrode layer 21, consequently resulting in at least part of one branch 112 of each pixel electrode 110 being at the first distance from the common electrode layer 21, and at least part of another branch 112 being at the second distance from the common electrode layer 21.

In some embodiments of this application, the second organic insulating layer 23 is made of an organic material, such as positive or negative photoresist.

In some embodiments of this application, the second organic insulating layer 23 can be structured using a halftone mask process to form multiple third parts 231 with a third thickness h3 and multiple fourth parts 232 with a fourth thickness h4. This can create a step at the junction between the third part 231 and the fourth part 232. Utilizing the difference in thickness between the third part 231 and the fourth part 232, the arrangement ensures that within each pixel electrode 110, at least part of one branch 112 is at the first distance from the common electrode layer 21, while at least part of another branch 112 is at the second distance from the common electrode layer 21.

In some embodiments of this application, the first substrate 10 includes a color filter layer 14, the second substrate 20 includes a second base 22, as well as a second organic insulating layer 23 positioned on a surface of the second base 22, and a common electrode layer 21 located on a surface of the second organic insulating layer 23 away from the second base 22.

In the display panel provided by this application, since the color filter layer 14 is positioned on the first substrate 10, it simplifies the structure of the second substrate 20, reducing the number of layers in the second substrate 20. This allows the second organic insulating layer 23 to be directly placed on the surface of the second base 22, thereby improving the precision of thickness control for the third part 231 and fourth part 232 within the second organic insulating layer 23, further enhancing the display performance at wide viewing angles.

In summary, the present application provides a display panel and a display device. The display panel includes a first substrate, a second substrate, and a light-modulating medium layer, where the first substrate includes a first base and a pixel electrode layer positioned on one side of the first base; the light-modulating medium layer is set on one side of the pixel electrode layer away from the first base; the second substrate is positioned on one side of the light-modulating medium layer away from the first substrate, and includes a second base and a common electrode layer facing towards the light-modulating medium layer; the first substrate also includes a first organic insulating layer, positioned between the first base and the pixel electrode layer, which causes a surface of the pixel electrode layer facing away from the first base to be uneven; alternatively, the second substrate includes a second organic insulating layer, positioned between the second base and the common electrode layer, which causes a surface of the common electrode layer facing away from the second base to be uneven. The display panel and the display device provided by this application can enhance the display effects at wide viewing angles while maintaining a high aperture ratio, high light transmittance, and low power consumption.

The detailed introduction provided above describes a display panel and a display device according to specific embodiments of this application. Specific examples have been used to explain the principles and implementations of this application. The description of these embodiments is intended to aid in understanding the methods and core ideas of this application. Furthermore, for those skilled in the art, changes in specific implementations and application scopes are anticipated based on the ideas of this application. Therefore, the contents of this document should not be construed as limiting the scope of this application.

What is claimed is:

1. A display panel, comprising:
a first substrate, comprising a first base and a pixel electrode layer disposed on one side of the first base;
a light-modulating medium layer, disposed on one side of the pixel electrode layer that is away from the first base; and
a second substrate, disposed on one side of the light-modulating medium layer that is away from the first substrate, the second substrate comprising a second base and a common electrode layer arranged on one side of the second base facing the light-modulating medium layer;
wherein the first substrate comprises a color filter layer and a first organic insulating layer, the first organic insulating layer is disposed between the first base and the pixel electrode layer and arranged between the color filter layer and the pixel electrode layer, and the first organic insulating layer causes a surface of the pixel electrode layer that is away from the first base to be uneven;
wherein the color filter layer comprises a plurality of color filter units, the pixel electrode layer comprises a plurality of pixel electrodes, the pixel electrodes are disposed corresponding to the color filter units in a one-to-one correspondence, and each of the pixel electrodes comprises a plurality of branches, wherein within each pixel electrode, at least part of one of the branches is at a first distance from a bottom surface of the color filter unit, and at least part of another branch is at a second distance from the bottom surface of the color filter unit, with the first distance being different from the second distance;
wherein the first organic insulating layer comprises a plurality of first parts and a plurality of second parts, each of the first parts possesses a first thickness, each of the second parts possesses a second thickness, and the first thickness is different from the second thickness;
at least part of one branch, which is at the first distance from the bottom surface of the color filter unit, corresponds to the first part, and at least part of another branch, which is at the second distance from the bottom surface of the color filter unit, corresponds to the second part;
wherein the color filter units comprise a plurality of first color filter units, a plurality of second color filter units, and a plurality of third color filter units; the first color filter units, the second color filter units, and the third color filter units have different light-transmitting colors; the first color filter units are red color filter units, the second color filter units are green color filter units, and the third color filter units are blue color filter units; the first color filter units and the second color filter units possess a same first thickness, and the third color filter units possess a second thickness greater than the first thickness;

wherein a thickness difference between the first thickness and the second thickness contributes to the first parts and the second parts correspond to the third color filter units being higher than the other first parts and the other second parts.

2. The display panel according to claim 1, wherein each of the pixel electrodes comprises four branches, each of the branches comprises a plurality of branch electrodes, and within each pixel electrode, orientations of the branch electrodes in any two branches are different;

in each of the pixel electrodes, two of the four branches are at the first distance from the bottom surface of the color filter unit, and the other two branches are at the second distance from the bottom surface of the color filter unit.

3. The display panel according to claim 2, wherein the pixel electrodes are sequentially arranged in the first direction and the second direction, wherein within each pixel electrode, two branches that are at the first distance from the bottom surface of the color filter unit are not adjacent to each other in the first direction and the second direction, and two branches that are at the second distance from the bottom surface of the color filter unit are not adjacent in the first direction and the second direction.

4. The display panel according to claim 3, wherein each of the pixel electrodes is divided into two first regions and two second regions, wherein in one of two adjacent pixel electrodes in the first direction, two branches at the first distance from the bottom surface of the color filter unit are located in the two first regions respectively, and the other two branches at the second distance from the bottom surface of the color filter unit are located in the two second regions respectively, while in the other of the two adjacent pixel electrodes in the first direction, two branches at the first distance from the bottom surface of the color filter unit are located in the two second regions respectively, and the other two branches at the second distance from the bottom surface of the color filter unit are located in the two first regions respectively.

5. The display panel according to claim 4, wherein in one of two adjacent pixel electrodes in the second direction, two branches that are at the first distance from the bottom surface of the color filter unit are located in the two first regions respectively, and the other two branches that are at the second distance from the bottom surface of the color filter unit are located in the two second regions respectively, while in the other of the two adjacent pixel electrodes in the second direction, two branches that are at the first distance from the bottom surface of the color filter unit are located in the two first regions respectively, and the other two branches that are at the second distance from the bottom surface of the color filter unit are located in the two second regions respectively.

6. The display panel according to claim 1, wherein each of the pixel electrodes comprises four branches, each of the branches comprises a plurality of branch electrodes, and within each pixel electrode, orientations of the branch electrodes in any two branches are different, wherein in each of the four branches, each branch comprises a first sub-branch and a second sub-branch, with the first sub-branch being at the first distance from the bottom surface of the color filter unit, and the second sub-branch being at the second distance from the bottom surface of the color filter unit;

within each of the pixel electrodes, two of the second sub-branches are located on one side of the four first sub-branches, while the other two second sub-branches are located on an opposite side of the four first sub-branches, and these two second sub-branches are symmetrically arranged with respect to the other two second sub-branches.

7. The display panel according to claim 1, wherein the second substrate comprises the second organic insulating layer, the second organic insulating layer comprises a plurality of third parts and a plurality of fourth parts, each of the third parts possesses a third thickness, and each of the fourth parts possesses a fourth thickness, with the third thickness being different from the fourth thickness.

8. A display device, comprising a display panel, wherein the display panel comprises:

a first substrate, comprising a first base and a pixel electrode layer disposed on one side of the first base;

a light-modulating medium layer, disposed on one side of the pixel electrode layer that is away from the first base; and a second substrate, disposed on one side of the light-modulating medium layer that is away from the first substrate, the second substrate comprising a second base and a common electrode layer arranged on one side of the second base facing the light-modulating medium layer;

wherein the first substrate comprises a color filter layer and a first organic insulating layer, the first organic insulating layer is disposed between the first base and the pixel electrode layer and arranged between the color filter layer and the pixel electrode layer, and the first organic insulating layer causes a surface of the pixel electrode layer that is away from the first base to be uneven;

wherein the color filter layer comprises a plurality of color filter units, the pixel electrode layer comprises a plurality of pixel electrodes, the pixel electrodes are disposed corresponding to the color filter units in a one-to-one correspondence, and each of the pixel electrodes comprises a plurality of branches, wherein within each pixel electrode, at least part of one of the branches is at a first distance from a bottom surface of the color filter unit, and at least part of another branch is at a second distance from the bottom surface of the color filter unit, with the first distance being different from the second distance;

wherein the first organic insulating layer comprises a plurality of first parts and a plurality of second parts, each of the first parts possesses a first thickness, each of the second parts possesses a second thickness, and the first thickness is different from the second thickness;

at least part of one branch, which is at the first distance from the bottom surface of the color filter unit, corresponds to the first part, and at least part of another branch, which is at the second distance from the bottom surface of the color filter unit, corresponds to the second part;

wherein the color filter units comprise a plurality of first color filter units, a plurality of second color filter units, and a plurality of third color filter units; the first color filter units, the second color filter units, and the third color filter units have different light-transmitting colors; the first color filter units are red color filter units, the second color filter units are green color filter units, and the third color filter units are blue color filter units; the first color filter units and the second color filter units have a same first thickness, and the third color filter units have a second thickness greater than the first thickness;

wherein a thickness difference between the first thickness and the second thickness contributes to the first parts and the second parts correspond to the third color filter units being higher than the other first parts and the other second parts.

9. The display device according to claim 8, wherein each of the pixel electrodes comprises four branches, each of the branches comprises a plurality of branch electrodes, and within each pixel electrode, orientations of the branch electrodes in any two branches are different;

in each of the pixel electrodes, two of the four branches are at the first distance from the bottom surface of the color filter unit, and the other two branches are at the second distance from the bottom surface of the color filter unit.

10. The display device according to claim 9, wherein the pixel electrodes are sequentially arranged in the first direction and the second direction, wherein within each pixel electrode, two branches that are at the first distance from the bottom surface of the color filter unit are not adjacent to each other in the first direction and the second direction, and two branches that are at the second distance from the bottom surface of the color filter unit are not adjacent in the first direction and the second direction.

11. The display device according to claim 10, wherein each of the pixel electrodes is divided into two first regions and two second regions, wherein in one of two adjacent pixel electrodes in the first direction, two branches at the first distance from the bottom surface of the color filter unit are located in the two first regions respectively, and the other two branches at the second distance from the bottom surface of the color filter unit are located in the two second regions respectively, while in the other of the two adjacent pixel electrodes in the first direction, two branches at the first distance from the bottom surface of the color filter unit are located in the two second regions respectively, and the other two branches at the second distance from the bottom surface of the color filter unit are located in the two first regions respectively.

12. The display device according to claim 11, wherein in one of two adjacent pixel electrodes in the second direction, two branches that are at the first distance from the bottom surface of the color filter unit are located in the two first regions respectively, and the other two branches that are at the second distance from the bottom surface of the color filter unit are located in the two second regions respectively, while in the other of the two adjacent pixel electrodes in the second direction, two branches that are at the first distance from the bottom surface of the color filter unit are located in the two first regions respectively, and the other two branches that are at the second distance from the bottom surface of the color filter unit are located in the two second regions respectively.

13. The display device according to claim 8, wherein each of the pixel electrodes comprises four branches, each of the branches comprises a plurality of branch electrodes, and within each pixel electrode, orientations of the branch electrodes in any two branches are different, wherein in each of the four branches, each branch comprises a first sub-branch and a second sub-branch, with the first sub-branch being at the first distance from the bottom surface of the color filter unit, and the second sub-branch being at the second distance from the bottom surface of the color filter unit;

within each of the pixel electrodes, two of the second sub-branches are located on one side of the four first sub-branches, while the other two second sub-branches are located on an opposite side of the four first sub-branches, and these two second sub-branches are symmetrically arranged with respect to the other two second sub-branches.

14. The display device according to claim 8, wherein the second substrate comprises the second organic insulating layer, the second organic insulating layer comprises a plurality of third parts and a plurality of fourth parts, each of the third parts possesses a third thickness, and each of the fourth parts possesses a fourth thickness, with the third thickness being different from the fourth thickness.

* * * * *